(12) United States Patent
Deliwala et al.

(10) Patent No.: US 10,423,953 B2
(45) Date of Patent: Sep. 24, 2019

(54) TRANSACTION DEVICE USE OF A DYNAMICALLY GENERATED VALUE BASED ON A NEXT EXPECTED SESSION KEY

(71) Applicant: American Express Travel Related Services Company, Inc., New York, NY (US)

(72) Inventors: Manish K. Deliwala, Chandler, AZ (US); Jonathan Lupton, Littlehampton (GB); Ajay B. Maddukuri, Phoenix, AZ (US); John G. McDonald, Eugene, OR (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 15/950,390

(22) Filed: Apr. 11, 2018

(65) Prior Publication Data

US 2018/0232733 A1    Aug. 16, 2018

Related U.S. Application Data

(63) Continuation of application No. 15/434,370, filed on Feb. 16, 2017, now Pat. No. 9,972,007, which is a
(Continued)

(51) Int. Cl.
*G06K 7/08* (2006.01)
*G06Q 20/38* (2012.01)
(Continued)

(52) U.S. Cl.
CPC ... *G06Q 20/3829* (2013.01); *G06K 19/06206* (2013.01); *G06Q 20/3226* (2013.01);
(Continued)

(58) Field of Classification Search
CPC ........... G06K 7/084; G06K 7/087; G07D 7/04
(Continued)

(56) References Cited

U.S. PATENT DOCUMENTS 8,579,203 B1    11/2013   Lambeth
9,613,306 B2     4/2017   Deliwala
(Continued)

OTHER PUBLICATIONS

USPTO: Office Action dated Aug. 5, 2016 in U.S. Appl. No. 14/958,638.
(Continued)

*Primary Examiner* — Ahshik Kim
(74) *Attorney, Agent, or Firm* — Snell & Wilmer, L.L.P.

(57) ABSTRACT

A system, method, and computer readable medium (collectively, the "system") are provided. The system may include a processor configured to perform operations and/or steps comprising storing, by a processor, a session key on a mobile device, wherein the session key is encrypted. The system receiving a transaction request, decrypting the session key, and broadcasting a signal configured for being received by a magnetic stripe reader. Track 1 data and/or track 2 data may be encoded in the signal. The track 1 data and/or the track 2 data may also comprise a dynamically generated value that is generated based on the session key.

18 Claims, 4 Drawing Sheets

Related U.S. Application Data continuation of application No. 14/958,638, filed on Dec. 3, 2015, now Pat. No. 9,613,306.

(60) Provisional application No. 62/212,477, filed on Aug. 31, 2015.

(51) Int. Cl.

| | |
|---|---|
| *G06K 19/06* | (2006.01) |
| *G06Q 20/32* | (2012.01) |
| *G06Q 20/36* | (2012.01) |
| *H04L 9/14* | (2006.01) |
| *H04L 9/08* | (2006.01) |
| *H04L 29/06* | (2006.01) |
| *H04W 12/04* | (2009.01) |
| *H04W 4/80* | (2018.01) |

(52) U.S. Cl.
CPC ........... *G06Q 20/36* (2013.01); *H04L 9/0863* (2013.01); *H04L 9/14* (2013.01); *H04L 63/067* (2013.01); *H04W 4/80* (2018.02); *H04W 12/04* (2013.01); *H04L 2209/56* (2013.01)

(58) Field of Classification Search
USPC .......................................................... 235/449
See application file for complete search history.

(56) References Cited

U.S. PATENT DOCUMENTS

| | | |
|---|---|---|
| 2008/0126260 A1 | 5/2008 | Cox |
| 2009/0103725 A1* | 4/2009 | Tang ..................... G06Q 20/20 380/45 |
| 2009/0159667 A1 | 6/2009 | Mullen |
| 2016/0162883 A1 | 6/2016 | Liscia |

OTHER PUBLICATIONS

USPTO: Notice of Allowance dated Feb. 2, 2017 in U.S. Appl. No. 14/958,638.
USPTO: Office Action dated Oct. 18, 2017 in U.S. Appl. No. 15/434,370.
USPTO: Notice of Allowance dated Jan. 16, 2018 in U.S. Appl. No. 15/434,370.
USPTO: Notice of Allowance dated Apr. 2, 2018 in U.S. Appl. No. 15/434,370.

\* cited by examiner

TRANSACTION DEVICE USE OF A DYNAMICALLY GENERATED VALUE BASED ON A NEXT EXPECTED SESSION KEY

CROSS-REFERENCE TO RELATED APPLICATIONS

This application is a continuation of, claims priority to and the benefit of, U.S. Ser. No. 15/434,370 filed Feb. 16, 2017 and entitled "NEXT EXPECTED SESSION KEY." The '370 application is a continuation of, claims priority to and the benefit of, U.S. Ser. No. 14/958,638 filed Dec. 3, 2015 and entitled "MAGNETIC CARD SWIPE EMULATION SYSTEMS AND METHODS," which issued as U.S. Pat. No. 9,613,306 on Apr. 4, 2017. The '638 Non-Provisional Patent Application claims priority to U.S. Provisional Patent Application Ser. No. 62/212,477, filed Aug. 31, 2015 and entitled "MAGNETIC CARD SWIPE EMULATION SYSTEMS AND METHODS." All of which are incorporated herein in their entirety for all purposes.

FIELD

The present disclosure relates to purchasing with a digital wallet on a mobile device using magnetic stripe emulation and communicating wirelessly with a magnetic stripe point of sale.

BACKGROUND

Typical magnetic stripe transactions are executed by running a card with a magnetic stripe through a card reader at a point of sale terminal. The card reader may extract data from the magnetic stripe and use the data to complete a transaction. In response to the card being swiped, a sales clerk can examine the card for a signature and request identification from the purchaser to identify the purchaser as the card owner. In that regard, the clerk may provide additional security in response to a standard credit card or debit card being used at a magnetic-stripe point of sale. Such checks may not be available to sales clerks in response to a magnetic swipe being emulated by a mobile device, as the physical plastic card may not be present.

Digital wallets streamline the payment protocol for transactions (e.g., purchases) for new purchase media, such as online via in-application payments and in store via near field communication (NFC). As more users acquire digital devices, the availability of digital wallet applications increases. However, the number of store locations with NFC capabilities to take advantage of digital wallet technology is lagging behind digital wallet availability. As such, many stores still rely on traditional point of sale interfaces including magnetic strip interfaces.

SUMMARY

A system, method, and computer readable medium (collectively, the "system") is disclosed for completing digital wallet transactions via a magnetic stripe terminal using locally stored session keys. The system may include a processor configured to perform operations and/or steps comprising storing, by a processor, a session key on a mobile device, wherein the session key is appropriately protected, e.g., enciphered and/or encrypted using encryption keys or by other means. The system receives a transaction request, decrypts the session key, and broadcasts a signal configured for being received by a magnetic stripe reader. Track 1 data and/or track 2 data may be encoded in the signal. The track 1 data and/or the track 2 data may also comprise a dynamically generated value that is generated based on the session key.

In various embodiments, the system may include requesting, by the processor, that a network trusted app encrypts the session key. The network trusted app may include a trusted execution environment chip. The processor may receive the session key from an enterprise wallet hub before storing the session key on the mobile device. The processor may further clear the session key, in response to broadcasting the signal configured for being received by the magnetic stripe reader. The signal may be encoded in a magnetic field. The processor may select magnetic stripe emulation as a communication medium, in response to not detecting a near field communication terminal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, a "digital wallet" includes a software and/or electronic device that facilitates individual e-commerce and m-commerce transactions. The digital wallet may operate by aggregating the transaction account holder's payment and/or billing information, serving as the merchant of record, and/or passing through the transaction account holder's payment and/or billing information to the end merchant. Examples of some of the more popular digital wallets currently available may include Apple Pay®, Passbook®, and Google Wallet™.

The present disclosure provides a system, method, and computer program product for using a digital wallet on a user device for transactions (e.g., purchases). The digital wallet transaction may be executed using a magnetic stripe interface. The user device may use a session key such as a limited use purchase credential (LUPC). The LUPC may be distributed by the issuer and may authorize point of sale purchases. The LUPC may be stored on the user device in a secure manner using, for example, encryption, which can include obfuscation to further protect sensitive data. The security protecting the LUPC tends to protect the LUPC long enough that the LUPC expires before an attacker can break the security. Thus, a user device may contact an issuer server or cloud network to retrieve one or more LUPCs in response to the user device being online. The user device may use one of the previously-retrieved and securely-stored LUPCs to authorize a point-of-sale purchase by emulating a magnetic card swipe at a point of sale terminal or by an NFC terminal, depending on the hardware available at the point of sale. Applications of the present disclosure may thus enhance usability of digital wallets in a secure manner and enhance the user experience and expedite processing.

Figure 1:
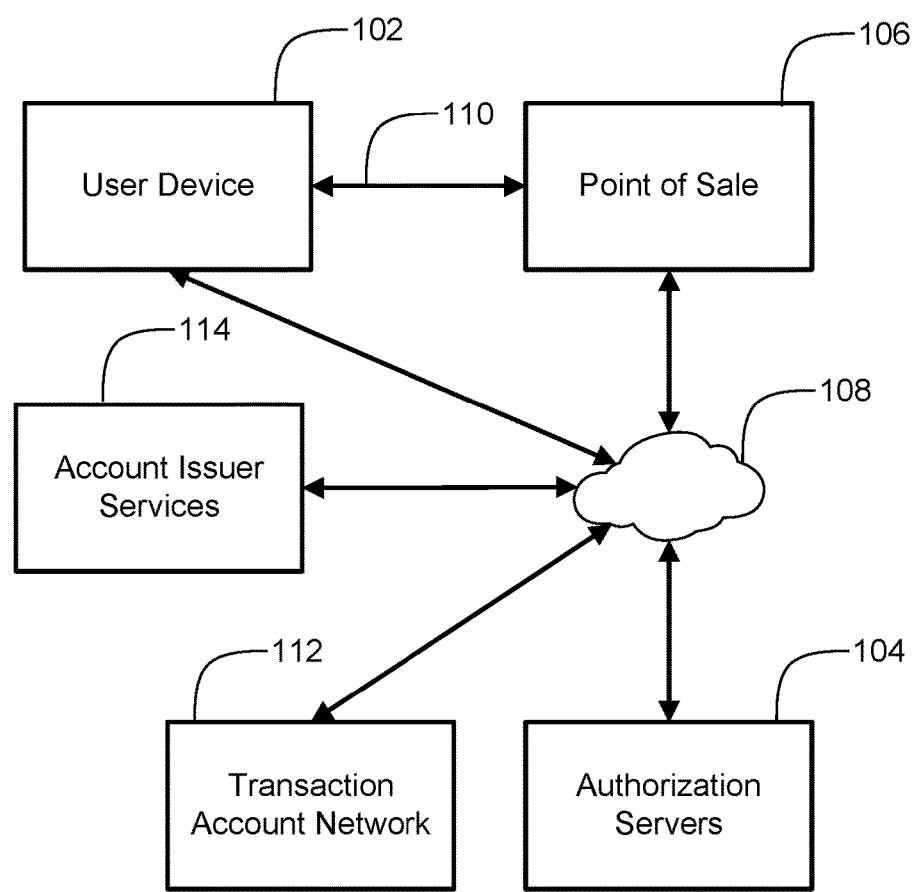
FIG. 1 illustrates an exemplary system for carrying out digital wallet transactions on a mobile device using a magnetic stripe terminal, in accordance with various embodiments.

With reference to FIG. 1, system 100 for transactions (e.g., purchases) using a digital wallet is shown, in accordance with various embodiments. System 100 may comprise a mobile device 102. Mobile device 102 may comprise any device capable of receiving and displaying an electronic message via a network 108. For example, mobile device 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over network 108. Mobile device 102 may communicate with point of sale 106 using electromagnetic radiation to emulate a card swipe across communication channel 110. Mobile device 102 may also communicate with other system nodes over network 108.

A network or communication channel may be unsecure and vulnerable to listening attacks. Thus, communication over network 108 or communication channel 110 may utilize data encryption. Encryption may be performed by way of any of the techniques now available in the art or which may become available—e.g., Twofish, RSA, El Gamal, Schorr signature, DSA, PGP, TDEA, AES, ECC, PKI, GPG (GnuPG), and symmetric and asymmetric cryptosystems.

In various embodiments, mobile device 102 may be in communication with point of sale 106 using a short-range, wireless communication medium. For example, mobile device 102 may communicate with point of sale 106 having a magnetic card reader by encoding data in a magnetic field configured to be received by the magnetic card reader. System 100 may also support provisioning of session keys and activating transaction accounts on mobile device 102, as disclosed in greater below. In response to provisioning requests and activation requests, transaction account network 112 and account issuer services 114 communicate with authorization servers 104 and mobile device 102 over network 108.

Figure 2:
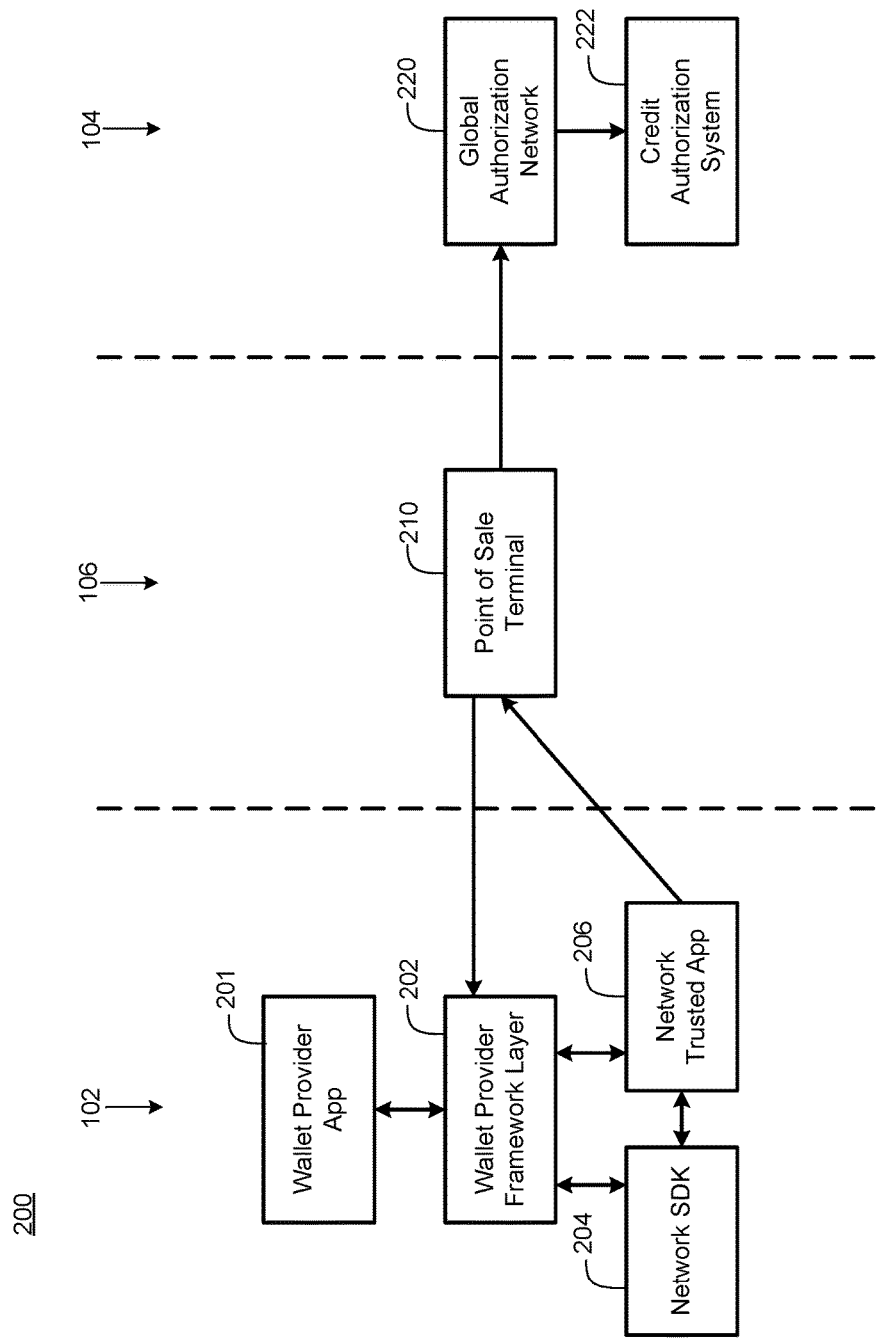
FIG. 2 illustrates exemplary software and hardware components for emulating a magnetic stripe card using a mobile device at a point of sale terminal, in accordance with various embodiments.

With reference to FIG. 2, an exemplary system for conducting transactions at point-of-sale terminal 210 using session keys on a mobile device 102 is shown, in accordance with various embodiments. Mobile device 102 may be a mobile device running magnetic stripe emulation (MSE) software. MSE software may enhance security for transactions completed in response to point-of-sale terminal 210 being a magnetic stripe terminal that lacks NFC compatibility with mobile device 102. For example, mobile device 102 may be a smartphone running an Android® operating system, which contains and/or runs a network software development kit (SDK) 204 and a network trusted app 206 configured to interface with an account provider network. Network SDK 204 may be provided by the issuer network. SDK 204 is a set of tools written and provided by the issuer network to allow other applications to interface with the issuer network. Mobile device 102 may communicate with point-of-sale terminal 210 to complete a transaction at point of sale 106.

Mobile device 102 may comprise multiple software and/or hardware components for emulating a magnetic stripe card in response to near field communication (NFC) not being unavailable. Mobile device 102 may broadcast magnetic stripe information relating to transaction accounts enabled on the digital wallet of mobile device 102. For example, mobile device 102 may be equipped with wireless payment software and/or hardware made available under the trademark LOOPPAY by LoopPay, Inc.

In various embodiments, the magnetic stripe transaction cards may carry track data as identified by the International Organization for Standardization (ISO) and the International Electrotechnical Commission (IEC) as ISO/IEC 7813. Thus, point-of-sale terminal 210 using magnetic stripe authentication may be configured to read track 1 data with a maximum record length of 79 alphanumeric characters and track 2 data with a maximum record length of 40 numeric digits. In that regard, mobile device 102 may transmit a wireless signal to point-of-sale terminal 210. The signal may comprise, among other account details, a transaction account number, a service code, an expiration date, and other information typically encoded in track 1 and/or track 2 as specified in ISO/IEC 7813. Additional information not originally included in the ISO/IEC 7813 specification may be transmitted in the track 1 and track 2 fields. Magnetic stripe authentication devices may be updated to allow for varying track 1 and track 2 lengths, or to incorporate the seldom-used track 3 for mobile device purchases.

In various embodiments, the track 1 and track 2 information exchanged in response to a magnetic card being swiped is limited, compared to the information exchanged during a typical NFC transaction. For example, in an NFC transaction, a digital signature may be transmitted from the device to indicate that the device is an authorized one, but a typical magnetic card transaction does not include a digital signature. Thus, additional security may be applied in response to wireless purchases being made using magnetic stripe emulation.

In various embodiments, wallet provider app 201 may be running on mobile device 102. Wallet provider app 201 may be a digital wallet application. In that regard, wallet provider app 201 may aggregate the transaction account holder's payment and/or billing information, serve as the merchant of record, and/or pass through the transaction account holder's payment and/or billing information to the end merchant.

The wallet provider application may interact with a wallet provider framework layer. Wallet provider framework layer 202 may provide functionality described in an API interface configured to communicate with a point-of-sale terminal 210 external to mobile device 102, as well as a network SDK 204 and a network trusted app 206 (both of which may be running on and/or integral to mobile device 102). The network SDK 204 may be provided by a transaction account network to serve as an interface between the network trusted app 206 and wallet provider framework layer 202. In that regard, the network SDK 204 may enable various wallet provider framework layers 202 to run on mobile device 102 despite being written and/or provided by various wallet providers.

In various embodiments, network trusted app 206 may be partially or wholly integrated into a security chip or otherwise integrated into dedicated hardware located on mobile device 102. For example, network trusted app may comprise a trusted execution environment (TEE) chip. The TEE chip may secure sensitive information such as encryption keys and session keys to enhance security of mobile device 102. Network SDK 204 may provide interface tools to interact with network trusted app 206 and request decryption and/or encryption services.

In various embodiments, mobile device 102 may communicate with point-of-sale terminal 210 located at point of sale 106. The communication may be initiated or maintained by the network trusted app 206 and/or wallet provider framework layer 202. Mobile device 102 may include an integral electromagnetic communication chip or be coupled to such a communication chip that is configured to encode data in the magnetic field proximate the point of sale terminal. Encoded data may comprise track 1 data, track 2 data, or any other data for transmission between the mobile device 102 and point-of-sale terminal 210.

In various embodiments, point-of-sale terminal 210 may communicate electronically with authorization servers 104. Authorization servers 104 may comprise servers integral to global authorization network 220 and credit authorization system 222. Authorization servers 104 may approve or decline transaction requests from point of sale 106.

Figure 3:
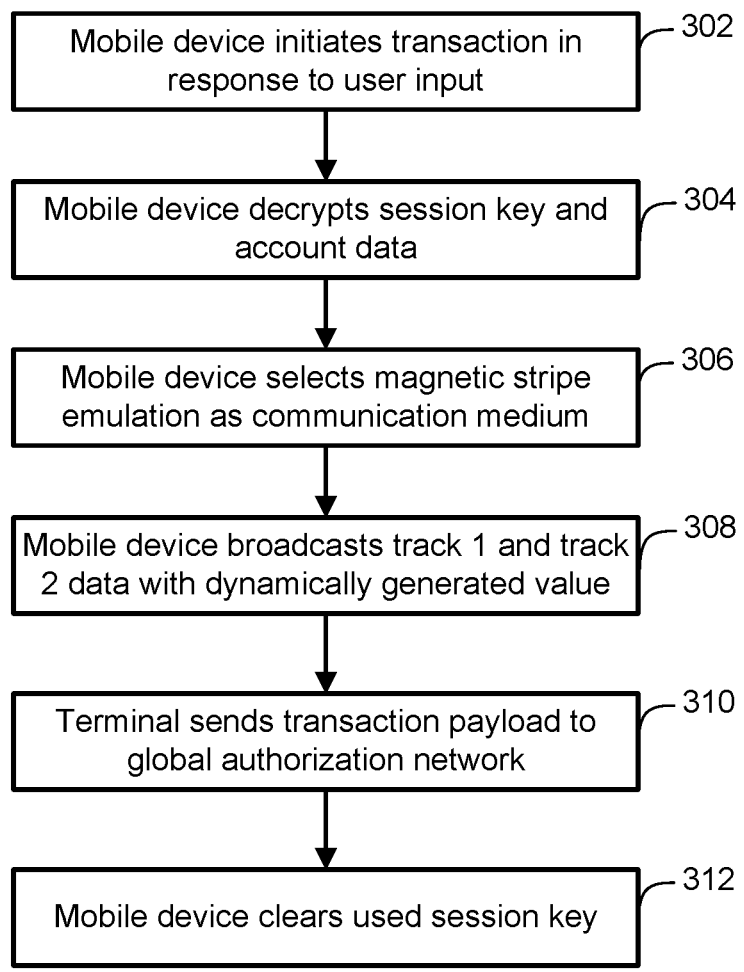
FIG. 3 illustrates a process for carrying out digital wallet transactions on a user device with a locally stored session key, in accordance with various embodiments.

With reference to FIGS. 2 and 3, a process 300 for emulating a magnetic stripe card using a mobile device 102 of system 200 is illustrated, in accordance with various embodiments. Process 300 may begin with mobile device 102 initiating a transaction in response to a user input (Block 302). The user input may be a user unlocking mobile device 102 or providing a security code, biometric input, or gesture to request a transaction. The input may tend to validate the user and increase the security of the transaction. The user may also open a digital wallet or payment application to request a transaction. From the digital wallet, a user may then select a transaction account in the digital wallet with which to initiate the transaction. The transaction account may be selected by a prompt on mobile device 102, for example.

Mobile device 102 may begin the transaction process by checking if a valid session key (i.e., a one-time session key such as LUPCs) associated with the selected transaction account is available for the payment transaction. The session keys may be time-limited and/or limited-use. For example, session keys may be set to expire after a predetermined time duration such as in 1/10 the time projected to break the security used on mobile device 102. Mobile device 102 may destroy session keys after using used or reaching the age limit. Mobile device 102 may request additional session keys in response to a number of session keys available falling below a minimum threshold, or the session keys present on mobile device 102 being near expiration. Mobile device 102 may check for session keys on regular intervals or in response to device state changes, such as in response to a device first connecting to a network. In response to session keys being received, the session keys may be encrypted and stored.

In various embodiments, mobile device 102 may then decrypt the session key (e.g., an LUPC as described above) and/or account data (Block 304). The decryption may be carried out using the network trusted app 206, which may include a secure hardware element such as a TEE. The TEE may include asymmetric and symmetric keys for use in various encryption algorithms. In that regard, network trusted app 206 may serve as the custodian for the encryption keys used to protect account information and session keys on mobile device 102. The session key and account data may be returned by network trusted app 206 and used by mobile device 102 to authorize a subsequent transaction. If no session key is available on mobile device 102, and no Internet connection is available to retrieve additional session keys, then the transaction may be terminated.

Mobile device 102 may then select magnetic stripe emulation as a communication medium for the transaction (Block 306). Mobile device 102 may select magnetic stripe emulation as a communication medium in response to not detecting an NFC terminal within communication range. Magnetic stripe emulation may comprise encoding card data into a magnetic field that can then be received by the magnetic head of a credit card reader. The magnetic field generated by mobile device 102 may emulate the same change in the magnetic field that occurs at the magnetic head of the card reader in response to a traditional credit card being swiped through the card reader. The range of the transmission and broadcasting steps from the mobile device may be limited in range and duration. For example, the range may be limited to less than 6 inches and the duration of the transmission may be less than 150 milliseconds. The limited duration and range may tend to increase the security of the transaction by limiting the availability of transmissions containing sensitive data.

In various embodiments, mobile device 102 may broadcast track 1 and/or track 2 data with a dynamically generated value (Block 308). The network trusted app 206 may provide the data for transmission in plain text or in an encrypted form. Track 1 and track 2 data may meet the standards of the ISO/IEC 7813 specification, as disclosed above. In place of actual transaction account data, alias data may be used. For example, an alias account number may be transmitted along with track 1 data in place of the actual account number. The alias account number may be mapped to the actual account number by the card issuer network so that mobile device 102 may not transmit the actual account number. Limiting the transmission of sensitive data and replacing sensitive data with an alias may tend to increase security of mobile device 102 and reduce points of attack.

In various embodiments, the track 1 and/or track 2 data may include a dynamically generated value in one or more of the track 1 and/or track 2 fields. For example, a card security code (CSC) field may be used to transmit the dynamically generated value. A CSC may also be referred to as a CID, CVC2, CVE, or CVV2 by various card issuers. The card security code field may be used to transmit a dynamically generated value generated from the session key rather than an actual CSC from a physical, plastic card or other account identification. The dynamically generated value may a numeric, alphanumeric, or character based value based on a session key and may be generated remotely and downloaded to mobile device 102 along with the session keys. Although a CSC field is identified in an example, other discretionary data fields or defined data fields meeting the ISO/IEC 7813 specification may be used to transmit the dynamically generated value.

In various embodiments, the session keys stored on mobile device may be generated by the network, as disclosed below, so that the session keys have an expected order of use. The authorization system may use the same algorithm as mobile device 102 to separately generate the numeric value. The authorization system may thus determine the expected numeric value received in the magnetic transmission from the next expected session key, which may be retrieved from a database with a database key corresponding to the transaction account number. For example, the numeric value in the CSC field may be generated by hashing the session key or a portion of the session key with a known number, or by truncating the session key to the desired number of digits. If the dynamically-generated numeric value does not match the expected value, a security attack may be indicated. During authorization, if the numeric value originally transmitted in the magnetic signal with the track 1/track 2 data does not match the expected value then the transaction may be declined.

In various embodiments, point-of-sale terminal 210 may send a transaction payload to the global authorization network (Block 310). The transaction payload may be a datagram containing transaction account information, transaction details (e.g., amount and date), and the numeric value from the CSC field in the track 1 and/or track 2 data. The transaction payload may be encrypted using the payment network's public key, for example, to secure the transmission from point-of-sale terminal 210 to global authorization network 220. The global authorization network 220 may forward the request to credit authorization system 222 for decisioning. In response to the transaction being completed, mobile device 102 may clear the session key used for the transaction (Block 312). The session key may be deleted in response to broadcasting a magnetic signal a predetermined number of times. For example, after broadcasting a magnetic signal five times, mobile device 102 may automatically delete a session key used in generating the numeric value for the CSC field. By clearing the used session key from mobile device 102, system 200 may ensure the used session key is not reused for a future transaction.

Figure 4:
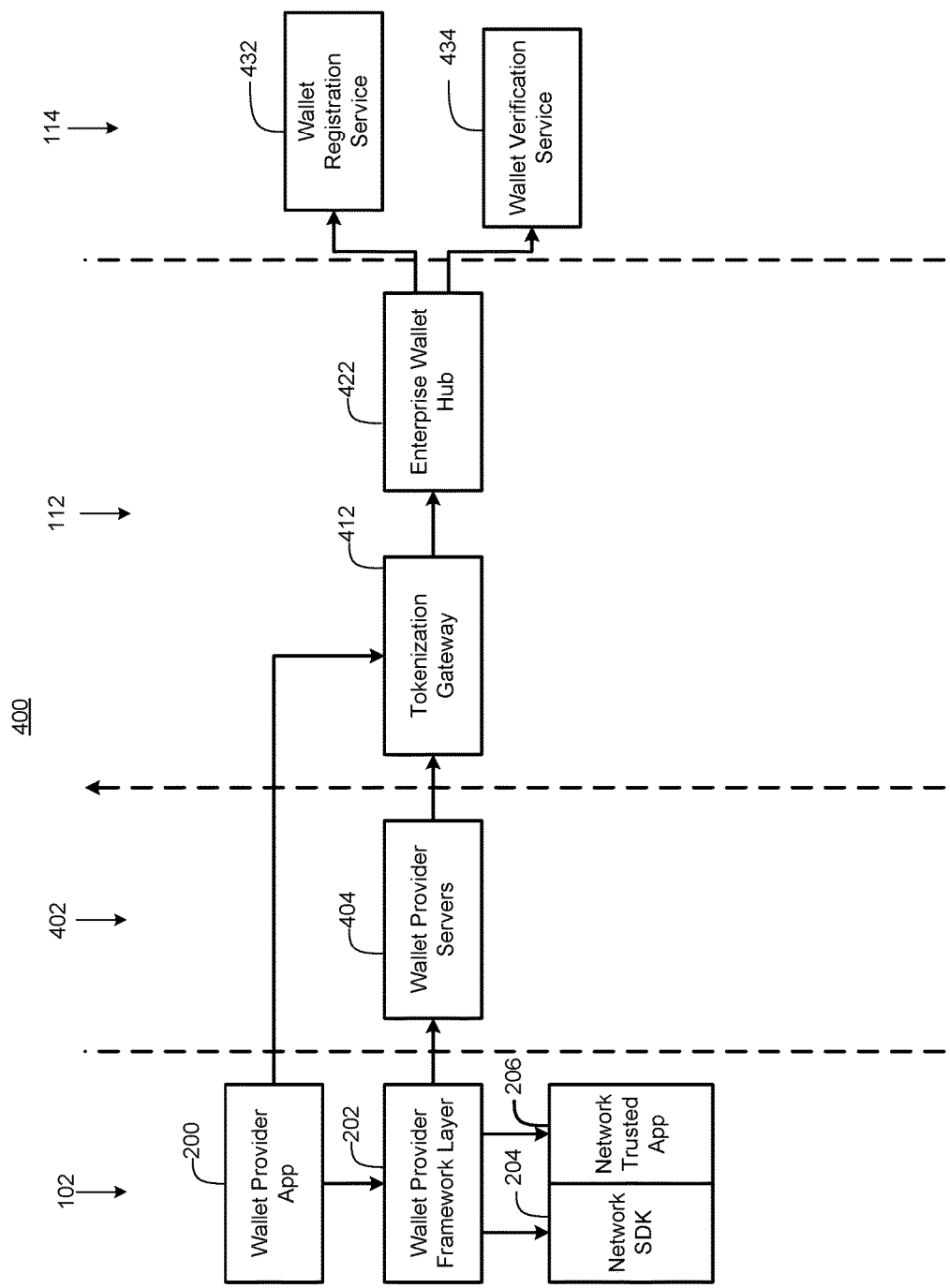
FIG. 4 illustrates exemplary software and hardware components for provisioning session keys and authorizing transaction accounts for use with a digital wallet, in accordance with various embodiments.

With reference to FIGS. 1 and 4, an exemplary system for provisioning active purchase accounts and session keys on mobile device 102 is shown, in accordance with various embodiments. Mobile device 102 may be configured as disclosed above with reference to FIG. 2 with wallet provider app 201 running on wallet provider framework layer 202, which further interacts with network SDK 204 and network trusted app 206, as described above.

In various embodiments, mobile device 102 may be in communication with wallet provider 402. Wallet provider servers 404 may further be in communication with transaction account network 112 via network 108. In that regard, mobile device 102 may not be in direct communication with transaction account network 112 during the provisioning process. Rather, mobile device 102 may send data to wallet provider servers 404, which may be forwarded by wallet provider servers 404 to enterprise wallet hub 422. Mobile device 102 may send a request to wallet provider servers 404 to add a transaction account to wallet provider app 201 for use in making payments on mobile device 102. The request may include transaction account information including an account number, CSC, expiration information from a physical card, risk information, and/or a wallet ID, for example. Wallet provider servers 404 may then forward the request to transaction account network 112. In response to the request being approved by transaction account network 112, a token (i.e., an alias identifying the transaction account) may be returned to wallet provider servers 404 and/or mobile device 102.

In various embodiments, transaction account provider may include a tokenization gateway 412 for accepting and verifying incoming requests and distributing tokens and/or session keys. Tokenization gateway 412 may comprise one or more systems for communicating with wallet provider servers 404. For example, tokenization gateway 412 may comprise separate inbound and outbound gateways for incoming and outgoing tokens and session keys. Enterprise wallet hub 422 may make decisions on incoming requests and outgoing responses. For example, in response to a request to validate a new transaction account for a mobile device, enterprise wallet hub 422 may decide whether or not the transaction account is authorized for digital wallet use. Some transaction accounts may be authorized for NFC transaction use but not magnetic stripe emulation use, depending on the desired level of security for the transaction account. In deciding whether an account may be validated for mobile device 102, enterprise wallet hub 422 may contact a wallet registration service 432.

In various embodiments, wallet registration service 432 may communicate with one or more authorization servers 104 maintained by the credit authorization system (CAS). Authorization servers 104 may provide a number of services associated with transaction accounts and transaction approval. For example, authorization servers 104 may provide a product profile service to communicate to enterprise wallet hub 422 as to whether or not a particular type of transaction account is authorized for digital wallet transactions. Authorization servers 104 may also provide a risk-assessment service to identify and validate customers based on the risk of fraud. The risk-assessment service may allow, decline, or request more information depending on the strength of the identification and validation information provided by the enterprise wallet hub 422. For example, a risk-assessment service may require additional one-time password validation of the consumer with the one-time password delivered by wallet verification service 434 through a known communication channel such as text, phone, or email.

In various embodiments, authorization servers 104 may also provide a payment credential service. The payment credential service running on authorization servers 104 may generate a predetermined number of session keys for delivery to mobile device 102. For example, the system may generate five session keys for completing transactions using the authorized transaction account on mobile device 102. The enterprise wallet hub 422 may receive session keys from the wallet verification service 434 and deliver the session keys to mobile device 102 along with account details for use in wallet provider app 201 on mobile device 102 in an encrypted package. The package may be encrypted such that it may only be decrypted using a private key that is present on the device. In a similar manner, enterprise wallet hub 422 may provide additional session keys for established accounts securely to mobile device 102 in response to a session key request.

The systems and methods herein enable secure storage and transmission of one-time keys for digital wallet transactions over emulated magnetic stripe. Additionally, the approach to protecting the stored keys provides robust protection for the life of the keys, which may be significantly shorter than the estimated time required to crack the keys. In that regard, magnetic stripe emulation may provide improved security for magnetic stripe transactions for transactions in which a mobile device emulates a magnetic card, but no physical card is presented.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, account member or the like shall include any person, entity, business, government organization, business, software, hardware, machine associated with a transaction account, buys merchant offerings offered by one or more merchants using the account and/or who is legally designated for performing transactions on the account, regardless of whether a physical account is associated with the account. For example, the account member may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, and JBOSS). In various embodiments, the server may include web servers (e.g. APACHE, IIS, GWS, SUN JAVA® SYSTEM WEB SERVER).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "card member", "business" or "merchant" may be used interchangeably with each other, and each shall mean any person, entity, government organization, business, machine, hardware, and/or software. A bank may be part of the system, but the bank may represent other types of account issuing institutions, such as credit account companies, account sponsoring companies, or third party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone account, embossed account, smart account, magnetic stripe account, bar code account, transponder, radio frequency account or an associated account. Phrases and terms similar to "transaction account" may include any account that may be used to facilitate a financial transaction.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, account, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart account"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a motion, a measurement and/or the like.

Phrases and terms similar to "financial institution", "transaction account network" or "transaction account issuer" may include any entity that offers transaction account services. Although often referred to as a "financial institution," the financial institution may represent any type of bank, lender or other type of account issuing institution, such as credit account companies, account sponsoring companies, or third party issuers under contract with financial institutions. It is further noted that other participants may be involved in some phases of the transaction, such as an intermediary settlement institution.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   generating, by a transaction device, a dynamically generated value based on a next expected session key; and
   transmitting, by the transaction device, a transaction request including the dynamically generated value,
   wherein the next expected session key from a plurality of session keys in the transaction device is decrypted, and
   wherein the plurality of session keys have an expected order of use.

2. The method of claim 1, further comprising receiving, by the transaction device, a signal that is used for the generating the dynamically generated value.

3. The method of claim 1, wherein at least one of track 1 emulated data or track 2 emulated data includes the dynamically generated value.

4. The method of claim 1, wherein at least one of track 1 emulated data or track 2 emulated data are encoded in a signal transmitted to the transaction device.

5. The method of claim 1, wherein the plurality of session keys are stored with the expected order of use.

6. The method of claim 1, wherein the plurality of session keys are stored having the expected order of use on the transaction device.

7. The method of claim 1, wherein the generating is in response to a signal being broadcasted.

8. The method of claim 1, wherein the transaction device is at least one of a mobile device or a magnetic stripe reader.

9. The method of claim 1, wherein a network trusted app encrypts the next expected session key.

10. The method of claim 1, wherein a network trusted app encrypts the next expected session key, and wherein the network trusted app comprises a trusted execution environment chip.

11. The method of claim 1, wherein the plurality of session keys are received from an enterprise wallet hub before the plurality of session keys are stored.

12. The method of claim 1, wherein the next expected session key is cleared in response to a signal with the dynamically generated value being transmitted.

13. The method of claim 1, wherein a signal with the dynamically generated value is encoded in a magnetic field.

14. The method of claim 1, further comprising using, by the transaction device, a magnetic stripe emulation as a communication medium, in response to not detecting a near field communication terminal.

15. A transaction device, comprising:
a processor; and
a tangible, non-transitory memory configured to communicate with the processor, the tangible, non-transitory memory having instructions stored thereon that, in response to execution by the processor, cause the processor to perform operations comprising:
generating a dynamically generated value based on a next expected session key; and
transmitting a transaction request including the dynamically generated value,
wherein the next expected session key from a plurality of session keys in the transaction device is decrypted, and
wherein the plurality of session keys have an expected order of use.

16. The device of claim 15, wherein at least one of track 1 emulated data or track 2 emulated data includes the dynamically generated value.

17. The device of claim 15, wherein at least one of track 1 emulated data or track 2 emulated data are encoded in a signal.

18. An article of manufacture including a non-transitory, tangible computer readable storage medium having instructions stored thereon that, in response to execution by a transaction device, cause the transaction device to perform operations comprising:
generating, by the transaction device, a dynamically generated value based on a next expected session key; and
transmitting, by the transaction device, a transaction request including the dynamically generated value,
wherein the next expected session key from a plurality of session keys in the transaction device is decrypted, and
wherein the plurality of session keys have an expected order of use.

* * * * *